United States Patent [19]

Schnebly et al.

[11] Patent Number: 4,928,369

[45] Date of Patent: May 29, 1990

[54] METHOD OF MAKING A PLEATED BLIND WITH ARTICULATIVE SLAT EXTENSIONS

[75] Inventors: John Schnebly, Albany; Thomas J. Marusak, Loudonville, both of N.Y.

[73] Assignee: Comfortex Corporation, Cohoes, N.Y.

[21] Appl. No.: 362,566

[22] Filed: Jun. 7, 1989

Related U.S. Application Data

[63] Continuation of Ser. No. 209,090, Jun. 20, 1988, Pat. No. 4,884,612.

[51] Int. Cl.[5] .......................... A47H 5/00; B23P 19/04

[52] U.S. Cl. ..................................... 29/24.5; 29/527.2

[58] Field of Search ............................. 29/24.5, 527.2; 160/84.1, 89, 120, 121.1, 166.1

[56] References Cited

U.S. PATENT DOCUMENTS

| | | | |
|---|---|---|---|
| 2,267,869 | 12/1941 | Coehr | 160/176.1 X |
| 2,994,370 | 8/1961 | Pinto | 160/89 |
| 4,535,828 | 8/1985 | Brocuhaus | 160/84.1 |
| 4,708,188 | 11/1987 | Bytheway, Jr. | 160/174 |

*Primary Examiner*—Timothy V. Eley
*Attorney, Agent, or Firm*—Schmeiser, Morelle & Watts

[57] ABSTRACT

A pleated, variable light-filtering, insulative window treatment. A horizontally or vertically pleated Venetian Blind is fashioned after two distinct processes with blind slats which extend rearwardly of the front pleated covering and, further, are cambered towards a motivation source proximate the planar cover. Articulator cords are used to move the trailing edges of the slat extensions uniformly in one direction while the forward edges of the slats are caused to pivot along the points of juncture of the slat leading edges and the trough lines of the front pleated cover. Upon complete articulation of the cambered slat edges, effecting an enclosure of the air space in the laterally disposed pleats by forming laterally concatenated air columns, a light-reflecting, room-darkening, highly insulative mode is achieved. Two processes, preferred by the inventors, are disclosed for manufacturing the invention's articulatable hinged extension slats, with the pleated fabric, to form the compound shade apparatus.

7 Claims, 10 Drawing Sheets

FIG. 4A
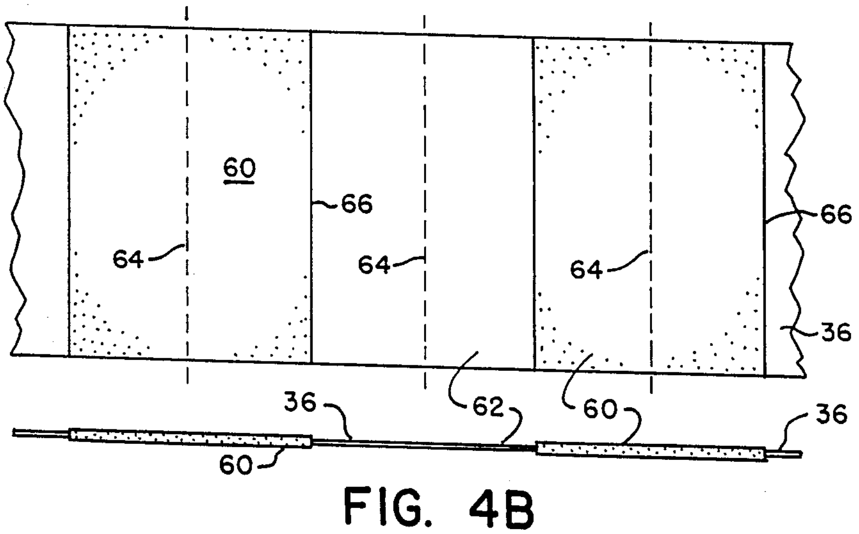
FIG. 4B
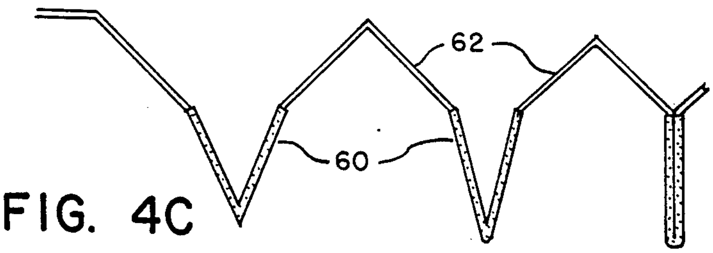
FIG. 4C
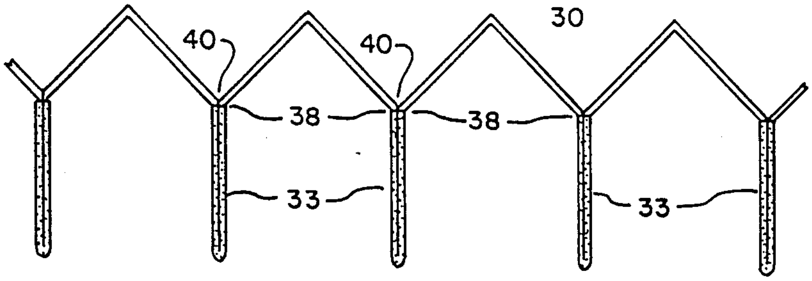
FIG. 5

FIG. 6A
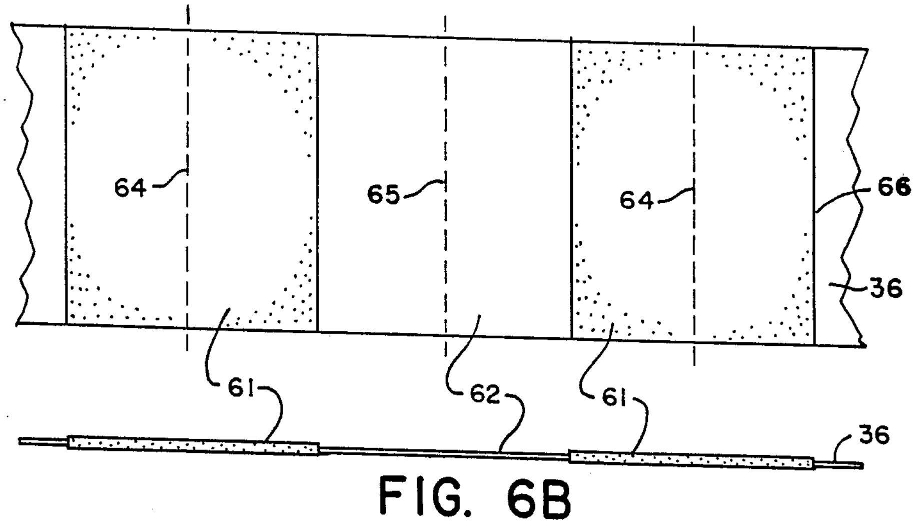
FIG. 6B
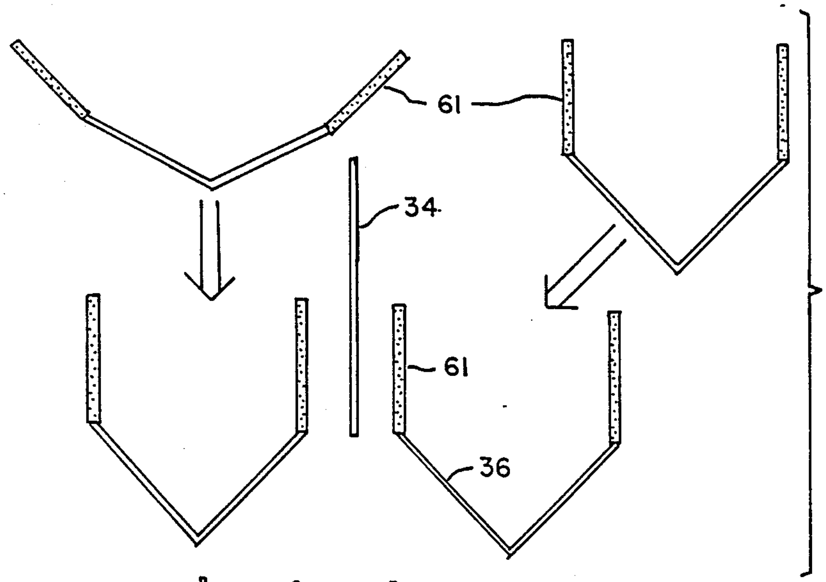
FIG. 6C
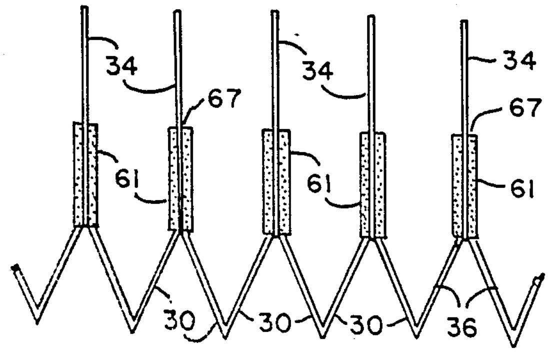
FIG. 7

FIG. 8
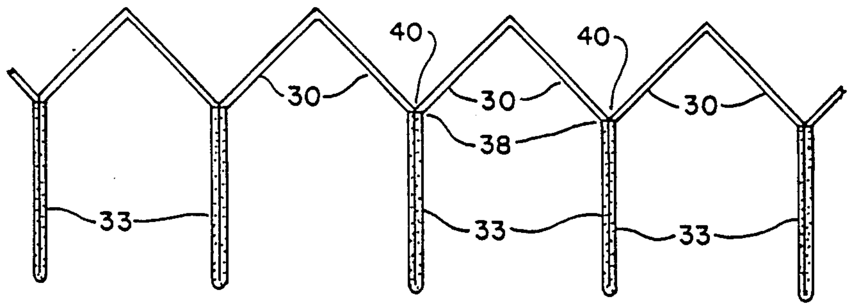
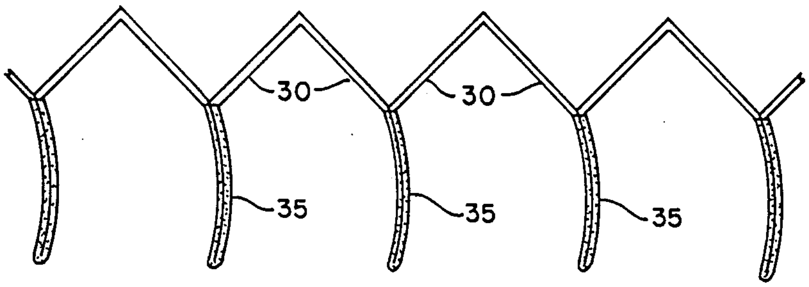
FIG. 9
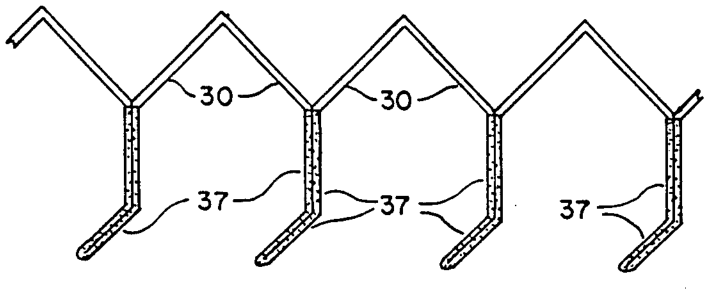
FIG. 10

FIG. 11
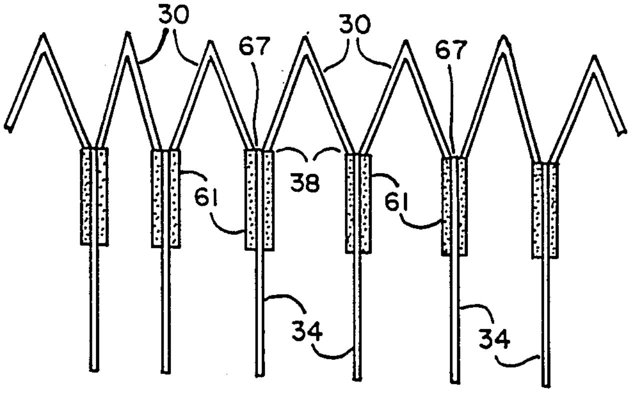
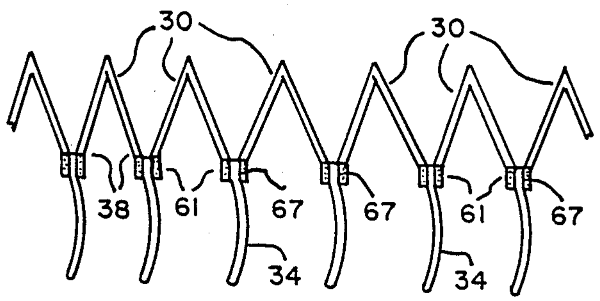
FIG. 12
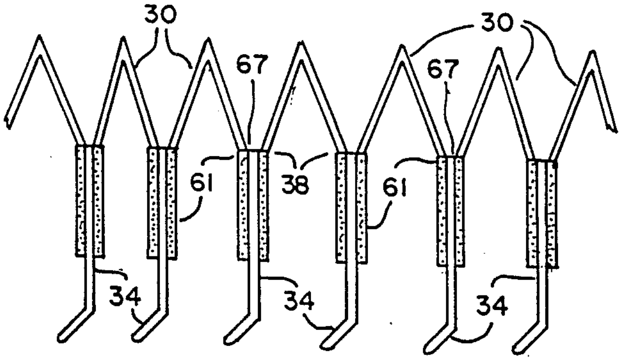
FIG. 13

FIG. 14A
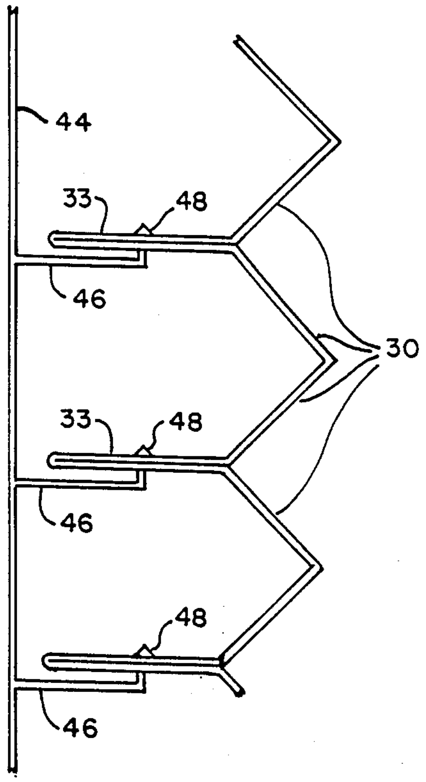
FIG. 14B
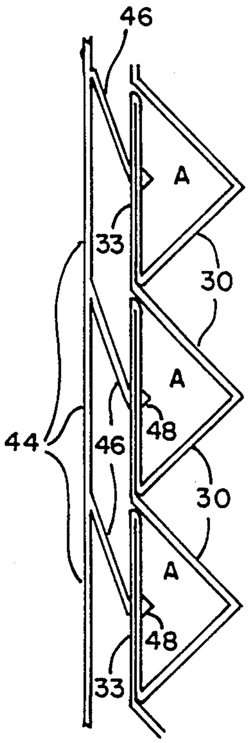
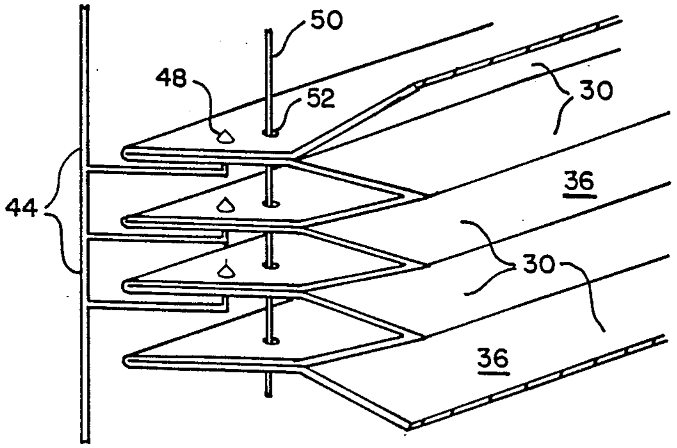
FIG. 15

FIG. 16
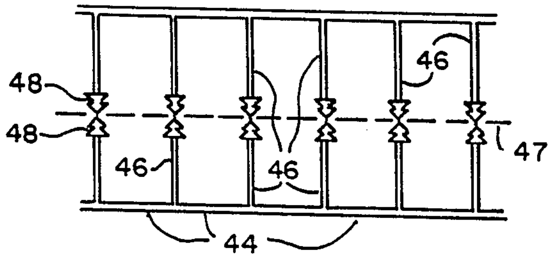
FIG. 17A
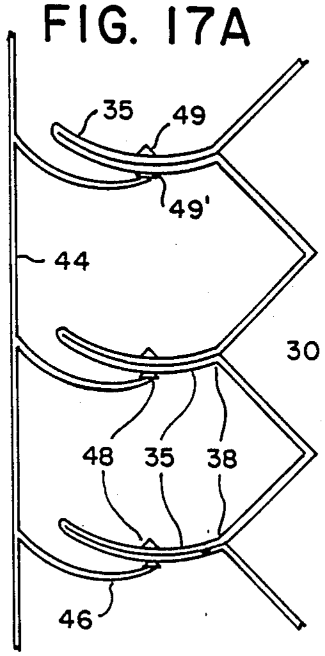
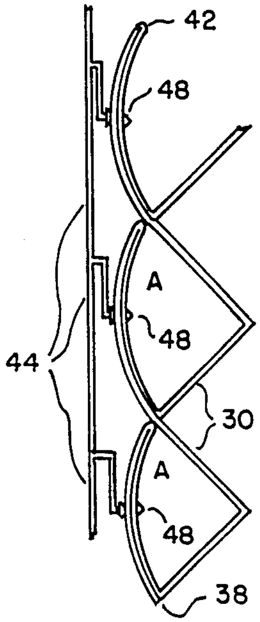
FIG. 17B
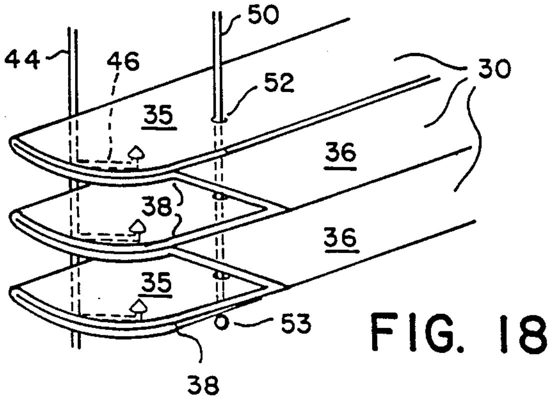
FIG. 18

FIG. 19A
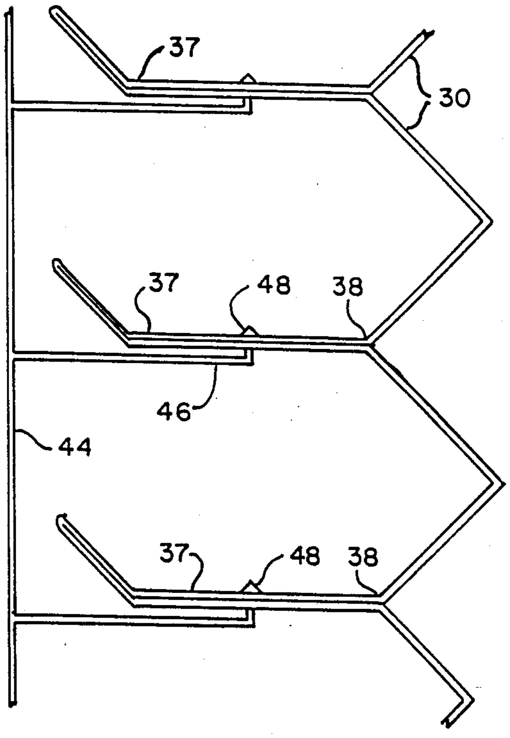
FIG. 19B
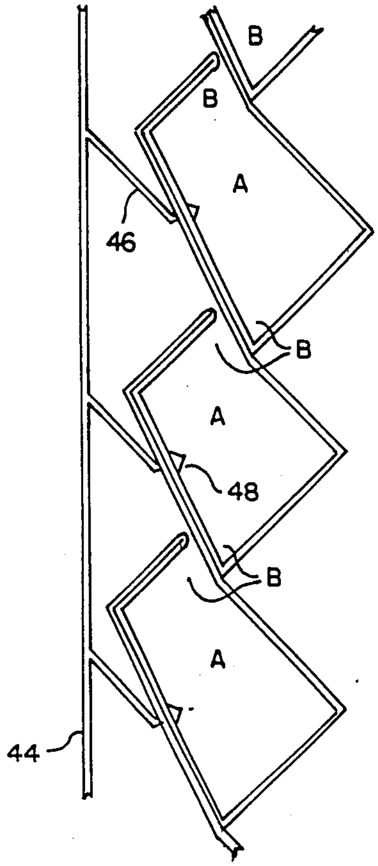
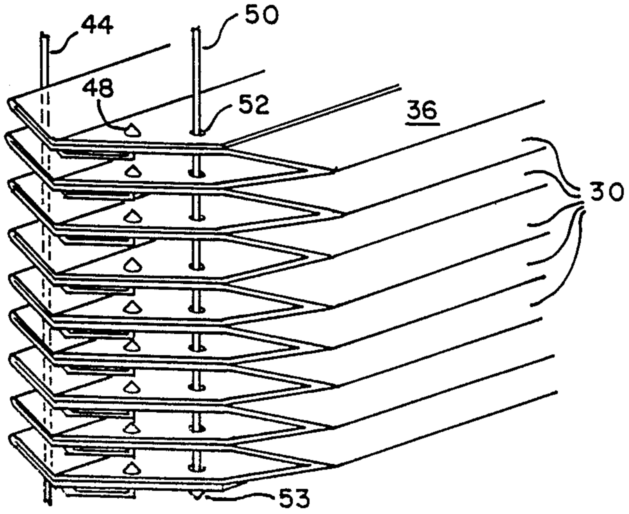
FIG. 20

METHOD OF MAKING A PLEATED BLIND WITH ARTICULATIVE SLAT EXTENSIONS

This application is a continuation of application Ser. No.: 07/209,090, filed on: June 20, 1988 now U.S. Pat. No. 4,884,612.

FIELD OF THE INVENTION

This invention relates to Venetian Blinds of the horizontally or vertically arrayed type and, more particularly, to pleated, variably reflective and insulative blinds. Increasing concern, in commercial as well as residential applications, for the value of solar heat gain through windows or transparent panels, mandates the innovative design of the instant invention. In addition to presenting a novel apparatus for effecting variable light reflectivity and transmission, methods for making blind slats and fabricating the invention are also provided.

BACKGROUND OF THE INVENTION

The instant invention presents a revolutionary concept in window treatment that provides a high degree of light control, while at the same time providing a significantly higher level of insulation and lower shading coefficient than previously available in energy efficient window treatments. The instant invention's "Venetian Blind" window treatment concept combines the functional advantages of providing light-filtering and room-darkening effects together with insulating and heat-blocking effects, all within a single pleated fabric shade format. It relies upon the recent development of new processes for applying high-remelt-temperature copolymers and powdered metal-loaded untraviolet (UV) -curable resins to polyester fabrics which are shaped into a novel mechanical configuration that results in a window shade system having directional and variable light transmissivity. A novel mechanical design for varying the light transmissivity involves surface modification of a pleated fabric and reflective slat articulation to create trapped air cavities or sleeves within the shade invention. This significantly reduces both convective and radiant heat transfer within and through the invention. The resulting window treatment system, in combination with multi-layer fenestration systems, yields thermal resistance values up to R 6.0.

Before the instant invention, numerous attempts had been made to selectively, incorporate what are inherent characteristics of the instant invention, namely, variable light transmissivity and variable insulative/heat-reflective properties. Some of these prior inventions also used methods for the manufacture of their novel devices. One of the most important forerunners of the "honeycomb shade" art was Rasmussen who, with U.S. Pat. No. 4,019,554 in 1977, set the stage in "honeycomb shade" devices for years to come. Rasmussen developed a thermal insulating curtain, for use especially in greenhouses, by adapting the slat array of the common Venetian Blind with parallel, interconnecting foldable fabric nettings, to obtain a rectilinear curtain comprised of two opposing fabric surfaces partitioned by an array of parallel slats. The Rasmussen invention is retracted by rolling the parallel fabric sheets on a cylindrical roller. Alternatively, if the slats are rigid enough, they may be drawn upward, one slat snuggly residing colinearly with the slat immediately above it and the fabric, pleated as it were, folding and overhanging the slats. The most significant disadvantage to the Rasmussen device is that light transmissivity depends upon the translucency or opacity of the interconnecting fabric. The slats are provided only for rigidity and to form the parallel "columns" of air which lend to the invention its insulative properties. As with light transmission, the fully raised or fully lowered position of the Rasmussen invention provides only a noninsulative or fully insulative character, respectively. Further, in the roll-up version, the rear panel is collected slightly ahead of the front panel; therefore, a tilting of the slats, one in respect of the others, takes place. This characteristic is a result of the fact that the rear panel, because of the collector (roller) geometry, is taken up a bit more rapidly than the front panel. Thus, the tilting of the slats is a natural resultant of rolling up the blind, rather than a design element provided by the inventor.

Notwithstanding the disclosures of Rasmussen, Anderson was issued U.S. Pat. No. 4,677,013 in 1987 for the method of forming a honeycomb structure that physically varied little from the Rasmussen concept. However, Anderson devised a novel means for forming his structure from a continuous length of foldable material that is folded into a Z-configuration and stacked in layers which are then adhered together. Additionally, U.S. Pat. No. 4,685,986 was issued to Anderson in 1987 for yet another method of making honeycomb structure by joining, two pleated sheets of material. The honeycomb structure is formed of two continuous lengths of pleated materials, secured together intermediate the pleats. Each length of pleated material defines one side of the honeycomb structure; and the two continuous lengths are secured together by feeding them longitudinally (lengthwise) toward each other. At their juncture, the confluent pleats are joined together at what may be defined as the "troughs" of the pleats. Relative to the materials disclosed in both of the Anderson inventions, it can be said that the inventor abhored the type of device that allows material to "hang out" when the slats are retracted for stowage or full daylight transmission. To this end, he discloses the use of non-woven fibers of polyester or woven materials of plastic, or materials combining textiles fibers plus plastic. Also revealed for usage are laminates in which bleed-through of adhesive can be controlled. Most importantly, in Anderson '986, it is indicated that the two pieces of material forming the opposite faces (of the cells) may be secured together by separate strip materials extending longitudinally between the cells. This arrangement is said to have the advantage that strip materials can be chosen so as to permit a wider choice of adhesives. Unfortunately, Anderson discloses this in '986, but not '013. The invention of, '986, consists essentially of the overlapping of two pleated fabrics at their cojoining verticles, longitudinally. Therefore, the strip to which the inventor referred, was initially quite narrow. Anderson did not apply this concept to the honeycomb structure of '013, which more closely resembles the Rasmussen invention. Thus, it may be said that Anderson did not contemplate the use of rigid slats to differentiate between the insulative air columns of his shade; but rather, only the overlapping material with adhesive therebetween (which would provide a modicum of stiffening) was employed.

Irrespective of the variation in both product and the manufacture of product of the extant art, none are seen to have provided the novel shade means hereinafter disclosed by the instant inventors, with its broad-spectrum light transmission, insulative/heat blocking characteristics. Most noticeable in the present state of the art insulative shades is the absence of an ability to vary such characteristics.

SUMMARY OF THE INVENTION

The aforementioned desirable characteristics of variablility in light transmission and correlative variability in insulative/heat blocking properties are acquired by radically altering the construction of current honeycomb shades. A front panel comprising a curtain of horizontally pleated fabric is pleat-partitioned with parallel lateral slats to form an array of horizontally disposed, laterally concatenated open sleeves. Further, the slats are cambered, that is, the slats are not always flat or of the more commonly observed airfoil shape; but rather the rearward edge of each slat is extended and curved upward relative to the horizontal disposition of the slats and the correlatively formed open sleeves. Novel methods, hereinafter mentioned, are employed to realize the slat frontal edge adhesion to the trough portions of the frontal pleated fabric.

The slats are articulative at their juncture with the pleat troughs; and, since they are extended rearward and cambered upward, and coupled one to the other, by urging them (as a set) upward toward the normal suspension base until eac cambered surface nearly touches the surface of the flat immediately above it, an air-filled insulating sleeve array is formed. Further, the outward facing surfaces of the cambered slat edges, defined as the rear or trailing edges, are coated with a reflective material which may be either translucent or opaque. Thus, when the cambered slats are articulatively closed, the resultant horizontally disposed array of insulative air sleeves is formed with additional light blocking and heat blocking characteristics provided by the externally treated surfaces of the cambered and/or trailing edges. Finally, to stow the shade, a readily available draw string mechanism is provided to draw up the base slat to literally "upwardly stack" the array, slat against slat. This feature can be readily realized since the cambered edge of each slat fits securely into the lower surface of the cambered slat immediately above it. The upward surface stacking is common, of course, to the more widely known Venetian Blind. Articulation of the extended, cambered slat is realized by the coupling of each slat to that immediately above and below it, by an articulator cord. The articulator cord comprises one half of the standard Venetian Blind actuating ladder, the division being made longitudinally to the ladder, through the rungs. The resultant articulator cord is therefoe defined as a half-ladder (a single rail and series of semi-rungs). The end of each semi-rung is attached by suitable means to the lower surface of each slat, that is to be cojoined and actuated in a common direction, between the slat's juncture with the front panel pleat trough and the curve breakpoint for the cambered trailing edge. The breakpoint being, of course, a rearward point on the underside of each articulative slat, rearward of the slat-trough juncture but foreward of the camber curve or distinct upward break. It may be readily ascertained, therefore, that with the cambered extension slat in the full horizontal position, light entering from outside may proceed unrestrictedly through the forward or front panel which consists essentially of a light filtering pleated fabric. As the cambered extension slat is articulated upward, its reflective exterior would begin to inhibit transmission of incident sunlight as well as reflect any thermal radiation. Ultimately, when the cambered extension slat is articulated fully upward, incident sunlight and heat are rejected and, additionally, laterally concatenated, multiple air-cavity, insulative sleeves are formed to reduce conductive and convective heat transfer. During night time usage, radiant transfer of interior room heat is reduced by the reflection of infrared from the closed sleeve array. The actual blind operation mechanics, being well known to those skilled in this art, will not be further discussed; it being the intent of the inventors to describe their novel apparatus and the means for making same.

The basic method of making the invention is essentially a set of alternatives for providing stiffening of the slat in order ot acquire its articulation with the pleated, front fabric in a practical, cost-efficient sense. The extensive slat may be of the straight, (essentially flat) type, the doglegged cambered type or the curvilinear cambered type. All are stiffened and the use of adhesive, known within the industry, is readily made. Indeed, it is the availability of modern plastics, copolymers, polyester fabrics and adhesives that has provided the inventors with the stimulus to produce a highly efficient, cost-effective and yet asthetic means of window treatment such as the instant invention.

Fundamental to the successful embodiment of the above-described apparatus is the process for acquiring a stiffened slat. Two processes are employed in the instant invention to achieve the required stiffness of the slat, irrespective of the particular geometry used in the slat trailing edge. The first process comprises adhesive coating the frontal edge of a slat which has been fabricated from a light metal, such as aluminum, or any of the many industrially available plastics and composites. Specifically, a continuous pleated polyester fabric is used to form the front fabric with compound troughs being formed in the general trough areas; the compound or secondary troughs being cut troughwise and receptive of adhesive coated slats therebetween. Once the slats are inserted between the secondary trough extensions, the polyester fabric is adhesively or thermally bonded to the slat frontal edge and the resultant product is a frontal pleated fabric with the pleats regularly separated (or partitioned), by parallel slats which articulate at the resultant pleating troughs.

An alternative process, but also preferred, conceives of first laying out the fabric which is to be pleated and transferred thereon an array of parallel, metal-loaded plastic resin strips onto the polyester fabric. The resin strips are arrayed so that there is an alternating pattern of fabric and resin-impregnated fabric. The fabric impregnated strips are then subjected to ultraviolet (UV) radiation to partially cure the metal-loaded plastic resin in order to facilitate handling. Thereafter, folds are created longitudinally in the fabric strips (transverse the fabric) and in the resin-impregnated fabric strips comporting to trough-to-trough pleats and slat-widths, respectively. Finally, the folded resin-impregnated fabric strips are folded closed and are fully cured thermally, providing metal-loaded, resin-impregnated fabric slats, the fabric of the slats being integral with the nonimpregnated, pleated fabric, thus realizing a product geometrically identical with that produced in the process and as described above.

In the first of two aforementioned processes or methods for providing slat stiffness, the cambered trailing edge slats must first be fabricated with the desired geometry. In the second method, that of impregnating the fabric with a metal-loaded plastic resin, the desired slat trailing edge geometry may be acquired at the time that the impregnated strips are folded and thermally bonded. An advantage to be gained through the use of the second process, using the UV-curable metal plastic stiffening, is similar to that of using the first with the metal of choice being aluminum, the resultant slats of stiffened fabric are reflective and light-weight.

The preferred embodiment of the invention relative the cambered slat trailing edges is a dogleg geometry; alternatively, the curved or curvilinear cambered slat has also proven to be a viable embodiment. It is also readily apparent, to those of ordinary skill in the art of shade fabrication, that combinations of the aforementioned processes will also result in similar, useful products. For example, if the fabricator desires to cut the fabric, rather than using a continuous pleated fabric, then the first of the aforementioned methods may be modified in view of the second; and, adhesive may be strip-overlayed the fabric which is then divided by cutting (rather then folding), and separate pleat extensions are adhesively or thermally bonded to both sides of separate stiffeners. Thus, various combinations of the inventors'preferred methods of manufacture may be had, limited only by the imagination of the fabricator.

BRIEF DESCRIPTION OF THE DRAWINGS Of the Drawings:

FIGS. 4A and 4B are orthographic illustrations depicting layout, and FIG. 4C the folding process for one method of making the invention.

FIG. 5 is a cross sectional illustration of the completed product made by the process of FIG. 4;

Figure 21:
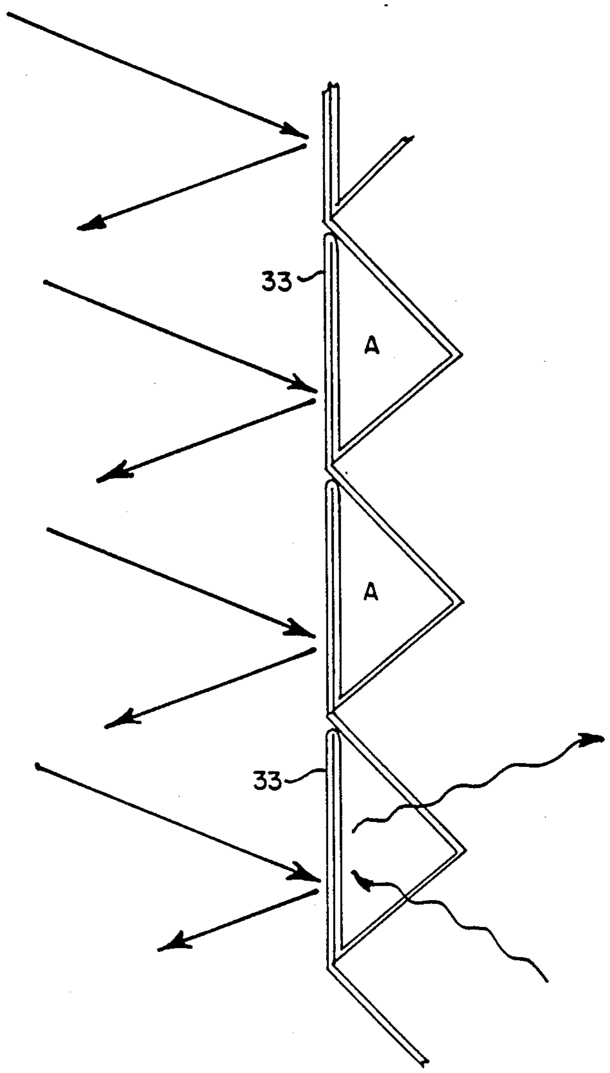
Figure 22:
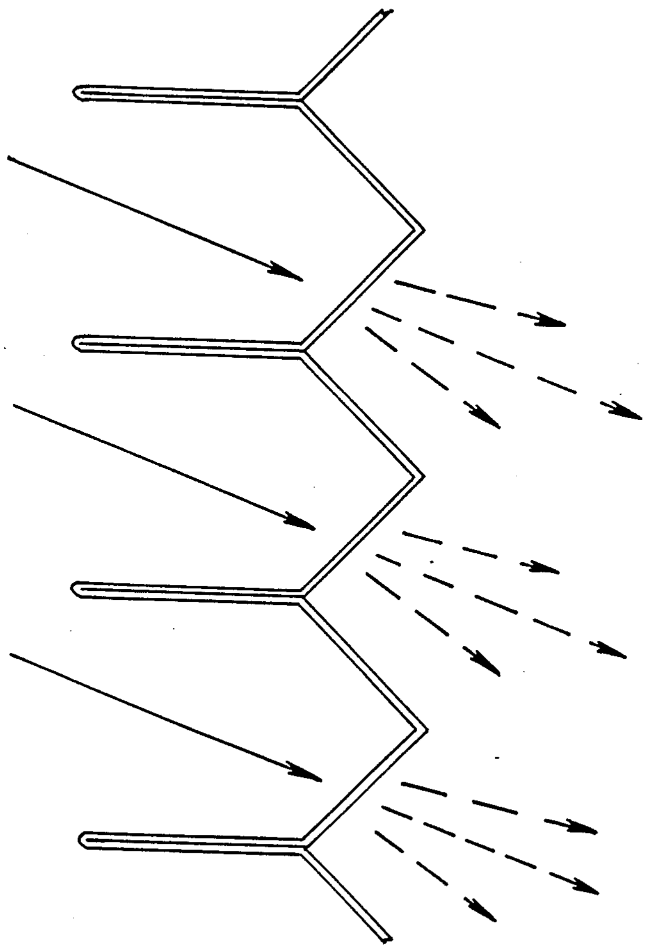

FIGS. 6A and 6B comprise an orthographic illustration of an alternative process for making the invention;

FIG. 6C is an exploded view depicting the formation of the product according to the process illustrated immediately above it as FIGS. 6A and 6B;

FIG. 7 is a cross sectional illustration of the product formed according to the process detailed in FIGS. 6A-6C;

FIGS. 8, 9 and 10 are cross sectional depictions of the invention employing the straight, cambered (curved) and cambered (dogleg) slats of the preferred embodiment constructed by the process shown in FIGS. 4A–5;

FIGS. 11, 12 and 13 are cross sectional illustrations of the product with straight, curved and dogleg slats, made according to the process disclosed in FIGS. 6A–B and 7;

FIGS. 14A and 14B are cross sectional side elevational illustrations of the straight slat embodiment, opened and closed, respectively;

FIG. 15 is a partial isometric illustration of the straight slat embodiment, open and with the invention in partial retraction (stylized);

FIG. 16 is a schematic depiction for making the articulator cord of the instant invention;

FIGS. 17A and 17B are cross sectional side elevations of the curved slat embodiment, open and closed, respectively;

FIG. 18 is a partial isometric illustration of the curved slat embodiment, open, and in partial retraction (stylized);

FIGS. 19A and 19B are cross sectional side elevations of the dogleg slat, open and closed, respectively;

FIG. 20 is a partial isometric illustration of the dogleg slat embodiment, open, and in partial retraction (stylized);

FIG. 21 is a cross sectional side elevation of the straight slat, as a general embodiment, to illustrate the light reflecting and fully insulative operating characteristics of the invention; and FIG. 22 corresponds to the FIG. 21 illustration depicting the light filtering, low insulative operating characteristics of the invention.

DETAILED DESCRIPTION OF THE PREFERRED EMBODIMENTS

As discussed earlier, there have been many attempts over the years to provide window treatment consisting of Venetian-type blinds covered by a planar fabric and generally drawn over front and rear lateral slat edges of the blind slat array. An exhaustive study of patents, technical publications and the literature available in the art of window coverings and treatment failed to disclose the concepts embodied in the instant invention. In fact, all of the prior art reviewed by the inventors, and which dealt with insulative window coverings, failed to provide teachings as to how one might gain the insulative character of the honeycomb blind structure, with its concommitant light filtering or room darkening characteristics, while still acquiring the ability to vary these characteristics and make an economical trade off between full sunlight, nonfiltered mode and a room darkening, fully insulative mode. Thus, where prior inventions have clearly failed, the instant invention succeeds.

Figure 1:
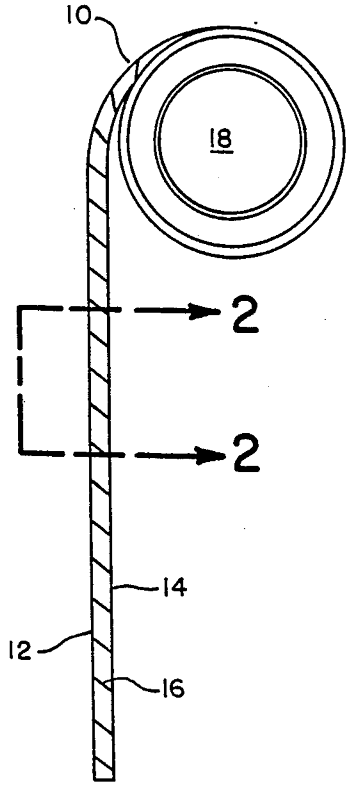
FIG. 1 is a sectional side elevation of a prior art honeycomb shade.
Figure 2:
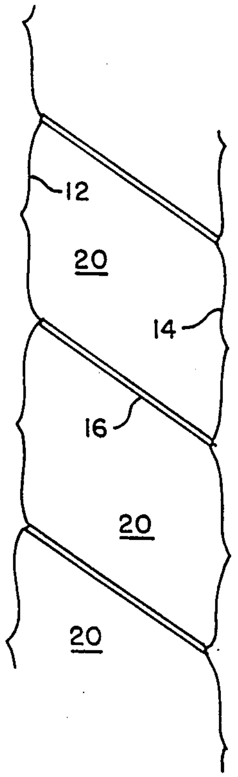
FIG. 2 is a section of FIG. 1 taken at 2—2.

Referring more particularly now to FIG. 1, there is depicted, in cross sectional elevation, the inventors'stylized representation of the most relevant prior art, Rasmussen '554. The honeycomb shade 10 of the Rasmussen invention comprises a front pleated panel 12 and a rear pleated panel 14 separated by an array of stiff slat members 16. The sectional element 2—2, depicted more clearly in FIG. 2, illustrates these basic elements. The planar fabrics 12, 14 of the Rasmussen invention may be of a translucent or opaque material so as to afford either light filtering or room darkening characteristics; but not both. However, beyond this, the alternative that comprises a lighted, noninsulative mode, may only be achieved by retracting the invention 10 on roller 18. When this is done, the slats 16 will, of course, take on an inclination as depicted in FIG. 2. The raising or dropping of the forward or rear lateral edges of the Rasmussen slats is a consequence of drawing two parallel planar surfaces over the same cylindrical object, such as roller 18. Since it is the purpose of the invention at this point to retract the shade, there is no teaching by the inventor of the variation in insulative qualities taking place in the multiplicity of air chambers 20 of the invention. In other Rasmussen embodiments, rather than rolling the invention in order to retract it, the stacking of slat elements is disclosed in much the manner of the conventional Venetian Blind. Nonetheless, the rolled version has been selected out by the inventors for discussion because it is the only instance in which they were able to discover the tilting of a slat array, in combination with a honeycomb or pleated fabric shade.

Figure 3:
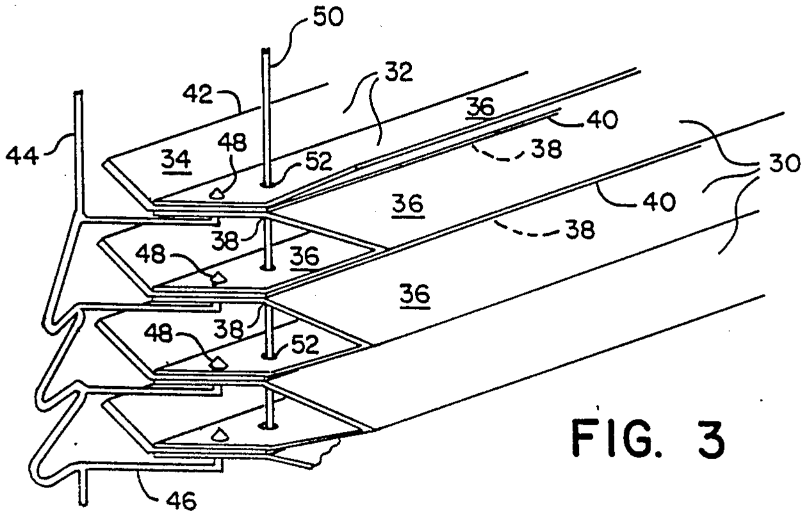
FIG. 3 is an isometric illustration near the end portion of the invention bearing a dogleg cambered slat.

FIG. 3 illustrates, in sectional isometric detail , the preferred embodiment employing what is termed a pleated blind 30 with articulative cambered (dogleg) slats 32. Here, the cambered slat is constructed by inserting a stiffener 34 of dogleg shape between portions of the pleating material 36 so that it is effectively hinged, that is, articulative, along the slat front (lateral)) edges 38 that are coincident and coextensive with the pleat 30 troughs 40. The rear (lateral) edges 42 of the slats 32 are free and are cambered (curved) uniformly in one direction. The direction of curvature is generally upward or towards the means (not shown) of articulation when the invention is oriented so that its slat array is horizontal or vertical, respectively. Articulator cord 44 is used to gang the articulative slats 32 so that they may be moved or deflected uniformly in one direction. The articulator cord is joined to each slat 32 by a semi-rung 46 which digresses from the cord and attaches to the underside or convex surface of cambered slat 32 at anchor 48 location. Those of ordinary skill will recognize that fixation of rung 46 to the underside or convex side of the slat 32 may be achieved by various means. As will be described later, in greater detail, it is the purpose of articulator cord 44 to motivate the slats 32 uniformly in one direction. Thus, semi-rungs 46 may be anchor 48 tip inserted into the slat, glued by suitable adhesive means, or laminated between the slat stiffener 34 and the pleat fabric 36. Lastly, retraction cord 50 is seen passing through the coaxially aligned holes 52 in slats 32. By conventionally known means cord 52 is retracted, drawing the last slat in the array towards the means of retraction/motivation (not shown) and literally "stacking" the slats one against the other. Further to this disclosure, the reader will be apprised of the distinction between the prior art which purports to stack Venetian Blinds as a means of retraction, wherein the tiltability of the various slats or vanes contraindicates usage with a pleated fabric, and the instant invention, wherein a pleated fabric is used in conjunction with a tiltable slat. Indeed, a slat of this particular geometry, which inculcates the variable insulative characteristic as devised by the inventors, is the answer to a long felt-need for both commercial and residential window treatments.

As pointed out during the discussion and description of FIG. 3, the slats 32 comprise elements of a geometry which may be acquired in a variety of ways. The inventors prefer to make the invention using two of the many methods by which they successfully produced the instant invention. In the first of these methods, depicted in FIGS. 4A, 4C and 5, a continuous planar fabric 36 is laid out and parallel, equal areas of predetermined size, generally corresponding to a pleat width, from trough-to-trough, are delimited. Referring particularly to FIG. 4A and 4B, an orthographic representation of the layout activity, planar fabric 36 is illustrated delimited as the stipled area 60 and plain area 62. Fold lines 64 in the delimited, partitioned areas as depicted approximately one-half way between the areas and parallel to the margin 66. A plastic resin with ultraviolet (UV) light photo-initiators is reverse-roll-coated onto the fabric 36 in the stipled areas 60. This impregnates the fabric with the plastic resin. Immediately threafter, the treated fabric is UV light cured and the fabric is folded into a periodic pleat structure by folding along the dashed paths 64. In order to acquire the desired properties of mechanical stiffness and thermal reflectivity, in addition to directional light reflectivity, the plastic resin is loaded with aluminum powder which causes the resin to become opaque to visible light and emissive of long wave infrared (IR) radiation. The aluminum impregnated resin is applied in strip coats to the polyester fabric prior to UV curing. This development allows the fabricator to stiffen and surface coat the fabric in selected areas so that it will reflect IR radiation and thereby control radiative heat gain. Thereafter, as in the aforementioned process, the impregnated fabric is folded, resulting in the structure illustrated in FIG. 4C. The stiffened portion 60 of secondary troughed fabric may then be treated with suitable adhesive and heat bonded, trough sides together, as depicted in FIG. 5, resulting in the formation of a pleated fabric 30 articulatively hinged 38, at the troughs 40, to the stiffened slats. Now known to the industry, a heat bonding adhesive (copolymer) of polyester and glycol, may be heat cured at a temperature of 200° F., but will not remelt until temperatures of over 300° F. are reached. It is the advent of such adhesives that literally gives rise to the second method of producing the pleat-slat ensemble that is so unique to the instant invention.

The second method of production of the invention (FIGS. 6A–6C) is similar to the first with the exception that fold lines 64 and 65 (new) are now demarcated on the pattern. Line 65 remain lines of fold and lines 64 are cut. Similarly, the areas of former metal/plastic resin infusion 60 (in FIGS. 4A–5) becomes areas 61, area 5 of melt-high remelt heat bonding adhesive, such as mentioned above. Immediately after the curing of the adhesive, folds are made along the pleat margins and apices and the fabric is cut along lines 65. The resultant pleat-root elements are depicted in FIG. 6C with the areas denoted at pleat root extensions 61, comprising adhesive impregnated fabric. A plastic, composite or aluminum slat stiffener 34 is then heat bonded between the two pleat extension roots 61, as shown. The resultant product of the aforementioned operation, illustrated in FIG. 7, can readily be seen to effect the same physical characteristics (geometry) as the product depicted in FIG. 5. Referring back to the method of attaching the articulator cord 44 rung 46 to each articulative slat 32, it may be noted that the rungs may be inserted at points 67 by laminating them between the stiffener 34 and root extensions 61 during the heat bonding process. More specifically in the slat binding process, it has been shown that slats comprised of light metal such as aluminum, or high melt temperature plastics, may be first coated with the aforesaid adhesive in order to form a more integral product by this process. This is clearly a distinctive manufacturing advantage to be gained in utilizing the second process of fabrication.

Having described the general embodiment, in contrast with the art currently available, and delineating the two favored processes used in the fabrication of the preferred embodiments, it is now appropriate to discuss three versions of the preferred embodiment of the articulative cambered slat with a pleated shade fabric. The fabric is made of a polyester composition and may be constructed of varying opacity and colors having, as a consequence, varying light admissive characteristics, in myriad colors.

The first and simplest version of the preferred embodiment, realizing the pleated blind with a straight slat, is depicted in FIG. 8. The pleated fabric 30 is depicted attached to a straight slat 33, the straight slat having been constructed by either of the two aforementioned processes. FIG. 8 is, in fact, a replication of FIG. 5 and the parts enumerated therein remain the same.

In similar fashion, FIG. 9 depicts the invention of FIG. 8 with the second of the third versions of slat, the cambered curved 35 embodiment. FIG. 10, like its predecessor, depicts the last version of the slat, namely, the cambered dogleg 37 embodiment. But for the variation in geometric configuration of the slats, all other elements of the preferred embodiment are the same. Further, since at this point in this disclosure the three versions of the articulative slat have been distinguished as straight 33, curved 35 and dogleg 37, numerology that was formerly used to identify slats 32 and trailing edges 34, more specifically the stiffener which comprised the trailing edge, will now be used only in delineating those specific elements i.e., slat 32 and stiffener 34. Where only the geometry of interest is discussed, it shall be denoted by the terms straight (slat) 33, curved (slat) 35 and dogleg (slat) 37.

In relating the three versions of the preferred embodiment in FIGS. 8–10, the slat stiffener 34 was not identified because the process used to create the three versions of slat was obviously the first process discussed in the instant application, namely, the process of FIGS. 4A, 4B, 4C and 5. It is now appropriate to disclose the second process of fabrication, that of cutting the adhesive-infused fabric and mounting it about the leading lateral edge of a slat stiffener. In FIGS. 11–13, the three geometries of slat trailing edge, straight, curved and doglegged are disclosed in the finished form in the manner presented earlier in FIG. 7. Identical and analogous parts, namely, the pleated fabric and adhesive-infused fabric retain their original numerology while the slat stiffeners are all identified by the numeral 34. In FIGS. 11–13, the reader's attention is drawn to the existence in of point 67 representing the juncture between the adhesive-infused fabric portion 61 and the slat stiffener 34. For the sake of clarity, most enumeration has been left out of FIGS. 11–13; however, the points of pivot 38, so critical to the disclosure of the invention, are denoted at least once in FIGS. 11, 12 and 13.

FIGS. 14A, 14B and 15 represent in stylized cross sectional elevation, as well a partial isometric, the embodiment of FIG. 5, as realized by the use of the first process for manufacture that was discussed in FIGS. 4A, 4B and 4C.

As depicted specifically in FIGS. 14A and 14B, articulator cord 44 is connected by the diffusion of semi-rungs 46 to the heat bonded slat 33 by anchor 48, a single barbed, flat based "push-in" type of connector. Later in this disclosure, the inventors shall reveal an expedient, low cost production means for making this novel means of connection. It is, however, noteworthy at this point to disclose to the reader other means for attaching semi-rungs 46 to the various slat geometries. As pointed out while discussing the second manufacturing process, exemplified by FIGS. 6A–7, the semi-rung 46 may be placed between the adhesive-infused fabric 61 and the slat stiffener 34. This variation in fabrication processes is noted at this point simply because it cannot be effectively employed when the fabrication process involves the folding and heat bonding of trough extensions as exemplified in FIGS. 4A through 5, and here-now in FIGS. 14A through 15. Thus, FIG. 15 is a stylized version of the straight slat embodiment of the invention, after the fashion of FIG. 3.

As indicated earlier, a novel method is made available and taught by the inventors for making the half-ladder articulator cord 44 with digressing semi-rungs 46 and push-in anchors 48. FIG. 16 depicts a segment of commercially available Venetian Blind actuator cord ladder. During the manufacturing process, each rung is fed into a roll-molding apparatus of the type known to those in the industry. Opposing, double barbed points are roll-molded on each rung at the center line 47 as depicted. Thereafter, the molded points are separated with the ladder rungs 46 along center line 47. This two-step operation thus provides two articulation cords with a series of semi-rung 46 digressions. When the anchor 48 is inserted into the tyical slat, at the convex side a denoted in FIG. 17A the first barb 49 is passed through the fabric, emerging at the upper or concave side of the slat 35 and the second or lower barb 49' seats at the under or convex side of the slat. Effort must be exerted to press first barb 49 through the slat material which is relatively resilient. Thus, the anchor 48 empales slat 35 and is captured between barb 49 and 49'. FIG. 17B displays the apparatus of FIG. 17A in the actuated or closed position and, like FIG. 14B, clearly depicts the formation of air chambers A resulting from the closure of the invention. The illustration of FIG. 17B more clearly depicts articulation of the curved slat 35 at pivot 38 than heretofore shown. The point at which the trailing edge 42 of any slat contacts the surface of the slat towards which it is being motivated is clearly dependent upon the width of the slat from pivot point 38 to its trailing edge 42. In FIG. 17B contact is shown practically at the adjacent pivot point 38. Nevertheless, the width of the curved embodiment, as well as the doglegged embodiment, is a factor generally left to the discretion of the invention's manufacturer. Likewise, physical location of anchors 48, an important factor in determining the amount and ease of articulation, is also a matter left to the discretion of a particular shade's manufacturer.

As with FIGS. 3 and 15 before it, FIG. 18 is a partial, rather stylized isometric illustration of the cambered-curved (first process) embodiment. Unlike the two preceding figures, however, FIG. 18 clearly depicts the invention's retractor cord 50 passing through preformed holes in each of the slats and terminating with a bead anchor 53. For ease of illustration, bead anchor 53 is displayed somewhat below the last illustrated slat. Normally, it would be placed under a base slat (now shown) in order to facilitate the "upward stacking" of slat 35 upon slat when the shade is retracted. In fact, FIGS. 3, 15 and 18 depict a partial closing and stacking of the slats.

FIGS. 19A, 19B and 20 effectively depict the apparatus of FIGS. 17A, 17B and 18, respectively, but for the difference in use of the doglegged slat 37, as shown. As also disclosed earlier, the width of the doglegged slat has been extended somewhat so as to form enlarged air to spaces A at the points dentoed by B. This constitutes a correction of the deficiency apparent in FIG. 17B by increasing the dimension of air chambers A, avoiding the discontinuity of insulative character as seen in the concatenated triangular air chambers of FIG. 17B. FIG. 20 will be recognized as a more stylized version of FIG. 3. Noted here, however, that retractor cord 50 is shown terminating with barb anchor 53 which has been roll-molded to the end of the retractor cord in much the same manner as anchors 48, created during the proces exemplified in FIG. 16.

The remaining FIGS., 21 and 22, are sectional side elevations of the invention using the straight slat made according to the teachings of either process disclosed herein. It is the purpose of these two figures to disclose the insulative character, as well as the light reflective and IR emissive qualities of the invention in the room-darkening mode (FIG. 21) and then in the open or light filtering mode (FIG. 22). Beginning with the former, the extension slat has been raised to a vertical position in order to close off the bakc side of the pleated fabric, thus forming the laterally concatenated air column array. In FIG. 22, the slats have been lowered to the horizontal position thus allowing the invention to operate in its light filteriing or light diffusing mode. As mentioned, the closed or tubular air chambers A of FIG. 21 figure most prominently in this illustration. The pleated frontal fabric comprising the interior side of the shade allows infrared (IR) radiation to pass through from the interior or room side to be reflected by the vertical slat and, thus, be emitted back toward the room interior. Both sides of the articulating slat are reflective and exhibit that characteristic in the face of any radiant energy. Correspondingly, incident sunlight falling on the backside of the shade is reflected; and, thus, in the room darkening mode, the invention presents a rear face which is opaque to sunlight and a frontal face both reflective of IR energy and possessing highly insulative character because of the laterally concatenated air column A array.

When the articulating slats are dropped to a more nearly horizontal position, as depicted in FIG. 22, incident sunlight is allowed to pass through the former laterally disposed air columns (item A of FIG. 21, above) and pass through the light filtering polyester fabric medium which comprises the front, pleated aspect of the shade. By passage through the fabric, light transmissivity is both decreased and diffused so that a soft and colorful (depending upon the polyester fabric color) light is spilled into the interior. It is readily apparent to those of ordinary skill that the aforementioned characteristics and effects of shade usage are equally applicable to the other embodiments disclosed herein, namely, the cambered slat extension. As has been continuously pointed out, the chambered or straight slat extensions, when opened, may be stacked as readily as the common Venetian Blind. Further, although it may be said to be used more frequently with the laterally concentrated pleated array disposed horizontally, the invention, in its entirety, may be just as readily disposed vertically. Thus, upon opening of the shade, the stock would be to the left or right and the motivation of the slat extension would likewise be in a left or right direction, depending upon the placement of the motivation source.

Thus, it is to be understood that the instant invention should not be limited by the drawings and discussion herein, but rather it readily admits to alterations and modifications within the scope of the following claims.

What is claimed:

1. The method of making a pleated blind having hingably attached to pleat troughs thereof a plurality of slats, said method comprising demarcating on a sheet of shading material transverse lines of fold and areas to receive adhesive-stiffener coating, applying said adhesive-stiffener, and folding said sheet along a first set of said lines to acquire expandable pleats in non-adhesive areas and along a second set of lines to acquire cojoined adhesively bound pleat-trough extensions in and about one-half the width of the adhesive areas.

2. The method of claim 1 wherein said folding step further comprises form folding said pleat-trough extensions to acquire cambered surfaces therefor during the adhesive-set period.

3. The method of claim 1 wherein said folding step further comprises cutting along the lines of said second set and inserting for adhesion between the adhesive-applied sections of slat extensions additional pre-shaped slat elements so that said slat elements will be captured and adapted thereby as additional continuous trough-slat extensions.

4. For an extended, variably light-filtering, insulative curtain that comprises continuous pleated fabric and is adjustable between an extended light-filtering position and a collapsed position, wherein said pleated fabric defined an array of pleats having front-facing crests and rear-facing troughs when in said extended position and wherein said troughs are joined at common lateral edges so that a multiplicity of parallel slats are arrayed behind and attached to said pleated fabric, a front edge of each slat hingably connected to and along the common latreal edge of a trough of each of said pleats so that actuation means may be employed to urge the rear edge of each of said slats toward and into contact with an adjacent slat forming therebetween said contacting slats and their common lateral trough edges an insulative sleeve, the method of making said curtain comprising the steps of creating pleatings in a sheet of shading material while stiffening discrete portions of the pleated material and immediately thereafter joining said discrete portions to themselves in order to form the slats of said curtain, said slats extending articulatively because of said joining from the troughs of said pleats.

5. The method of claim 4 wherein said stiffening step further comprises determining said discrete portions of a pleat relative to the pleat crest, defining said portions as trough extensions and lengthening said extensions as deemed necessary to create slats of specific width.

6. The method of claim 5 wherein said stiffening step further comprises stiffening and cojoining the folded portions of said trough extensions by applying suitable adhesive thereto.

7. The method of claim 5 further comprising shaping and stiffening said lengthened extensions into desired cambered shapes of slats.

* * * * *